United States Patent [19]

Nagase et al.

[11] Patent Number: 4,900,489

[45] Date of Patent: Feb. 13, 1990

[54] METHOD FOR FORMING A SKIN FOAM ARTICLE

[75] Inventors: Takashi Nagase, Aichi; Yoshio Taguchi, Nagoya, both of Japan

[73] Assignee: Toyota Jidosha Kabushiki Kaisha, Japan

[21] Appl. No.: 239,029

[22] Filed: Aug. 29, 1988

Related U.S. Application Data

[63] Continuation of Ser. No. 923,607, Oct. 27, 1986, abandoned.

[51] Int. Cl.$^4$ .............. B29C 41/18; B29C 41/22; B29C 67/20; B32B 15/08
[52] U.S. Cl. .................. 264/46.5; 264/46.7; 264/255; 264/302; 264/DIG. 14
[58] Field of Search .......... 264/45.7, 45.5, 321, 264/45.1, 46.5, 46.7, 255, 301, 302, DIG. 14

[56] References Cited

U.S. PATENT DOCUMENTS

| | | | |
|---|---|---|---|
| 2,950,505 | 8/1960 | Frank | 264/255 X |
| 3,120,570 | 2/1964 | Kennedy et al. | 264/45.7 X |
| 3,123,403 | 3/1964 | Hood | 264/45.7 X |
| 3,161,436 | 12/1964 | Hood | 264/45.7 X |
| 3,381,999 | 5/1968 | Steere, Jr. | 264/45.7 X |
| 3,391,823 | 7/1968 | Tijms | 264/45.7 X |
| 3,426,110 | 2/1969 | Kesling | 264/45.7 |
| 3,478,134 | 11/1969 | Gruss et al. | 264/45.7 X |
| 3,652,748 | 3/1972 | Roberts | 264/45.7 |
| 3,664,976 | 5/1972 | Evans et al. | 264/45.5 X |
| 3,802,949 | 4/1974 | Brown et al. | 264/321 X |
| 3,840,627 | 10/1974 | Rhodes, Jr. | 264/46.5 X |
| 3,929,948 | 12/1975 | Welch et al. | 264/46.9 X |
| 3,955,043 | 5/1976 | Palmer et al. | 264/45.5 X |
| 3,962,390 | 6/1976 | Mori et al. | 264/45.7 X |
| 4,144,297 | 3/1979 | Tomar | 264/45.5 |
| 4,455,340 | 6/1984 | Okina | 264/46.6 X |
| 4,485,057 | 11/1984 | Kristensson et al. | 264/46.9 X |
| 4,548,779 | 10/1985 | Steinberg et al. | 264/255 |
| 4,800,116 | 1/1989 | Ventimiglia et al. | 264/255 X |

FOREIGN PATENT DOCUMENTS

| | | | |
|---|---|---|---|
| 983226 | 2/1976 | Canada | 264/45.7 |
| 49-45170 | 4/1974 | Japan | 264/45.7 |
| 51-106175 | 9/1976 | Japan | 264/45.7 |
| 58-132507 | 8/1983 | Japan . | |

OTHER PUBLICATIONS

Becker, Walter, E., Edt., *Reaction Injection Molding*, New York, Van Nostrand Reinhold, c1979, pp. 180-181.

Primary Examiner—Jeffery Thurlow
Assistant Examiner—Leo B. Tentoni
Attorney, Agent, or Firm—Finnegan, Henderson, Farabow, Garrett & Dunner

[57] ABSTRACT

A method is provided for producing an integral skin foam article made up of a skin, foam and core member. According to the method, an expanded layer which is of the same material as the skin is formed on the back of the skin prior to forming the article.

9 Claims, 2 Drawing Sheets

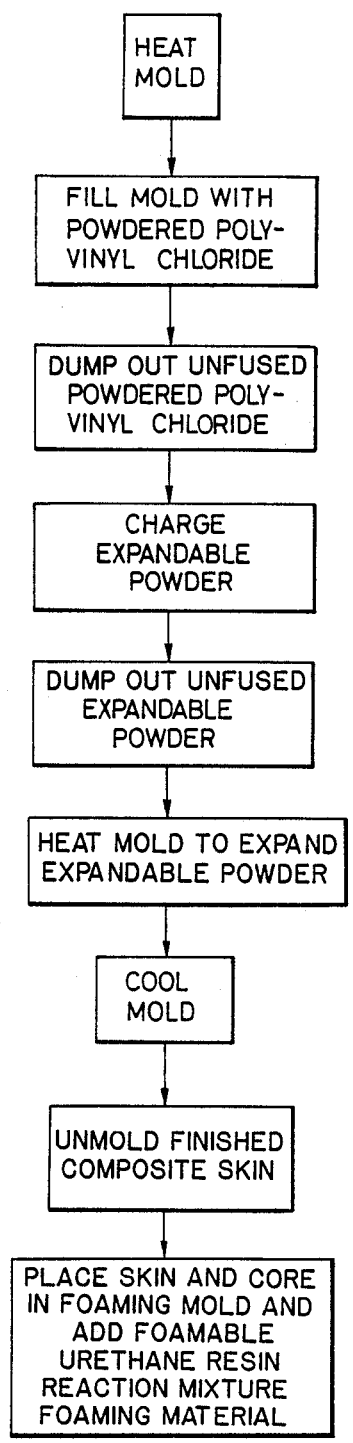
FIG. 1 INVENTION
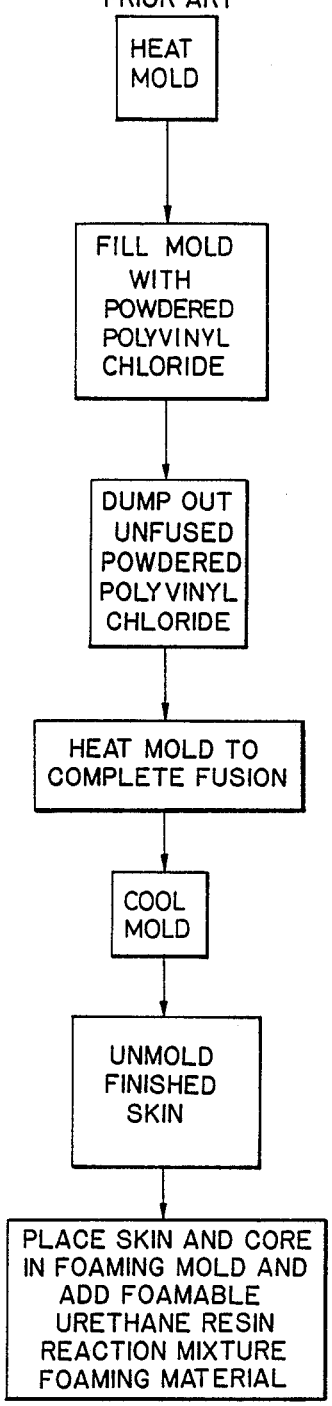
FIG. 4 PRIOR ART

METHOD FOR FORMING A SKIN FOAM ARTICLE

This application is a continuation of application Ser. No. 923,607, filed Oct. 27, 1986, now abandoned.

BACKGROUND OF THE INVENTION

1. Field of the Invention

The present invention relates to a method for forming the skin of a integral skin foam article. The method includes the steps of forming a skin and subsequently making the skin integral with a core member using a foam produced from polyurethane or the like.

2. Description of the Prior Art

There are several methods for forming the skin of an integral skin foam article. Powder slush molding is one of them. The basic process of slush molding, as illustrated by the flowchart in FIG. 4, involves heating a mold, e.g. to 200° C., filling the preheated mold with a powdered resin, e.g. polyvinyl chloride, permitting the mold to stand for a prescribed period of time, e.g. about 10 seconds, so that the powder in contact with the mold fuses to form a skin, and inverting the mold to recover the excess unfused powder. The mold is heated again and subsequently cooled, and the finished skin is demolded or unmolded, i.e., removed from the mold. The skin thus formed is placed in a foaming mold together with a core member, and a foaming material such as polyurethane is poured into the mold. Upon foaming, an integral skin foam article is obtained. An example of the integral skin foam article thus produced is shown in FIG. 5 in which there is shown a skin 1, core member 2, such as an iron plate, and a polyurethane foam layer 3.

In the conventional skin-forming method, however, the back of the skin 1 is in direct contact with the polyurethane foam 3, which permits the plasticizer in the polyvinyl chloride to migrate to the polyurethane foam. The migration of plasticizer induces degradation, cracking, and discoloration of the skin 1. This problem has been solved in the past by making the skin thicker than 0.8 to 1.0 mm. However, this, in turn, leads to an increase in material costs.

The present invention solves the above-mentioned problems by providing a method whereby plasticizer migration is eliminated or substantially reduced and less raw material is consumed. Accordingly, it is an object of the present invention to provide a method for forming the skin of an integral skin foam article, said skin to be made integral with a core member by the use of a foam in a foaming mold.

Additional objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purpose of the invention as embodied and broadly described herein, the skin for use in an integral skin foam article is provided on the back thereof with a foam or expanded layer of the same material prior to the foaming step to make the skin integral with the core member. To clearly distinguish the layer provided on the back of the skin from the foam which makes the skin integral with the core member, the former layer will be referred to hereinafter as the expanded layer of the skin. The expanded layer prevents the skin from coming into direct contact with the polyurethane foam layer.

The skin, isolated from the polyurethane layer by the expanded layer, is thus protected from degradation, cracking, and discoloration. In addition, the expanded layer increases the skin thickness using only a small amount of material, and this leads to a reduction in material costs.

In this invention, the preferred skin material is polyvinyl chloride, and the preferred foam is polyurethane. The combination of a polyvinyl chloride skin and a polyurethane foam is also preferred. The expanded layer on the back of the skin may be produced from a mixture of the raw material for the skin, e.g. polyvinyl chloride, in powdered form, and a suitable blowing agent therefor.

The accompanying drawings which are incorporated in and constitute a part of this specification, illustrate embodiments of the invention and, together with the description, serve to explain the principles of the invention.

BRIEF DESCRIPTION OF THE DRAWINGS

FIG. 1 is a flowchart showing the molding method of this invention.

FIG. 4 is a flowchart showing the conventional molding method.

DESCRIPTION OF THE PREFERRED EMBODIMENTS

Reference will now be made in detail to preferred embodiments of the invention, examples of which are illustrated in the accompanying drawings.

Figure 2:
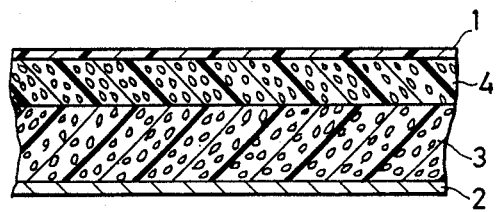
FIG. 2 is a sectional view of an integral skin foam article produced according to the method of this invention.

The invention will now be described in more detail with reference to the flowchart in FIG. 1 and the sectional view of the integral skin foam article shown in FIG. 2. First, the skin-forming mold is heated to about 200° C. The heated mold is filled with a powder mixture composed of 100 parts of polyvinyl chloride produced by suspension polymerization, 5 to 20 parts of polyvinyl chloride produced by emulsion polymerization, 50 to 80 parts of a plasticizer, and 3 to 10 parts of a stabilizer. After a short time, e.g. 1 to 2 seconds, the skin-forming mold is turned upside down and the unfused powder is dumped out for recovery. A thin skin of about 0.1 to 0.5 mm thickness, is formed on the inside of the mold.

The mold is refilled with a foaming powder, i.e., an expandable powder, composed of the above-mentioned polyvinyl chloride powder and 2 to 10 parts of a blowing agent therefor. The mold is allowed to stand for about 10 seconds. During this period, the expandable powder in contact with the previously formed skin fuses. The mold is inverted again to recover the unfused expandable powder. The mold is then heated, e.g. exposed to hot air at, for example, 200° to 250° C., so that the expandable powder which has fused on the back of the skin expands. In this way, a 0.4 to 3 mm thick expanded layer is formed. The skin 1 thus formed is made integral with a core member 2 by the use of a foam 3 according to the conventional method which is not described herein. An integral skin foam article thus produced is shown in FIG. 2, in which the reference numeral 4 indicates the expanded layer pertaining to the skin of the present invention.

The heat resistance of a skin produced according to this invention was compared with that of a skin produced by the conventional method. The results are graphically shown in FIG. 3. In the case of the skin produced according to this invention, the thickness means the total thickness of the skin 1 and the expanded layer 4. In the graph, the elongation at break measured after heat aging at 110° C. for 400 hours is plotted against the thickness of the skin. It is noted that the skin produced according to this invention is less heat resistant than a skin produced by the conventional method if the skin has a relatively great thickness; however, the skin of the present invention maintains almost the same elongation even when the thickness is reduced to 0.8 mm and below. This means that skins produced according to this invention are less susceptible to cracking than skins produced by conventional methods.

Figure 3:
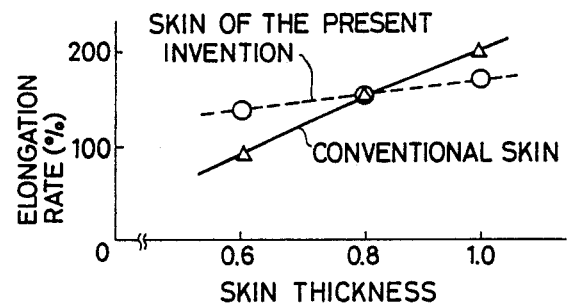
FIG. 3 is a graph showing the properties of skins produced according to the conventional method and the method of this invention.
Figure 5:
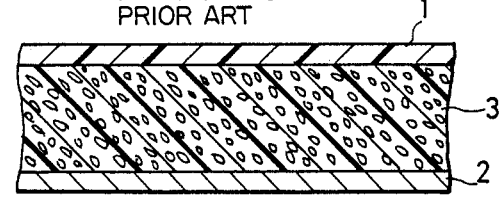
FIG. 5 is a sectional view of a conventional integral skin foam article.

As graphically illustrated in FIG. 3, a skin produced according to this invention is comparable in elongation to skins produced by conventional methods if the skin thickness is 0.8 mm. In Table 1, the method of this invention is compared with the conventional method in respect to the amount of raw materials required for one instrument panel having a skin thickness of 0.8 mm. It is noted that a saving of 412 grams per piece is achieved if the method of this invention is employed.

TABLE 1

Comparison of Raw Materials Used

| Method | Skin thickness (mm) | Amount of PVC (g/pc.) | | Savings (g/pc.) |
|---|---|---|---|---|
| Conventional | Solid layer: 0.8 | Solid PVC: | 1000 | |
| Present Invention | Solid layer: 0.3 | Solid PVC: | 375 | |
| | Expanded layer: 0.5 | Expanded PVC: | 213 | |
| | | Total | 588 | 412 |

The expanded layer has an expansion ratio of 3.

It will be apparent to those skilled in the art that various modifications and variations can be made in the method of the present invention for forming the skin of an integral skin foam article without departing from the scope or spirit of the invention. Thus, it is intended that the present invention cover the modifications and variations thereof provided they come within the scope of the appended claims and their equivalents.

What is claimed is:

1. A method for forming a skin foam article containing a core member, which method comprises:
   preparing a preformed and fused skin from a resinous material;
   forming on a surface of said preformed skin an expanded and fused layer of the same resinous material used to prepare said preformed skin; and
   producing a resinous foam between a core member and said expanded and fused layer to make said preformed skin integral with said core member.

2. The method as set forth in claim 1, wherein the core member is a plate.

3. The method as set forth in claim 2 wherein the plate is an iron plate.

4. The method as set forth in claim 1, wherein the preformed skin is a polyvinyl chloride skin.

5. The method as set forth in claim 1, wherein the foam is polyurethane foam.

6. The method as set forth in claim 5, wherein the expanded and fused layer on a surface of the preformed skin is produced by heating polyvinyl chloride having a blowing agent incorporated therein.

7. The method as set forth in claim 4, wherein the expanded and fused layer on a surface of the preformed skin is produced by heating polyvinyl chloride having a blowing agent incorporated therein.

8. The method as set forth in claim 1, wherein said preformed skin is formed from a mixture of powdered resin and a plasticizer, wherein said expanded and fused layer is formed from an expandable powder mixture of the same powdered resin used to form said preformed skin and a blowing agent therefor, and wherein said foam is formed from a foaming material.

9. A method for forming a skin structure of a skin foam article obtained by producing a foam together with a skin structure and a core member to make said skin structure integral with said core member, which method comprises forming an expanded layer on a surface of a preformed skin prior to producing said foam, said expanded layer being formed of the same material as the preformed skin.

* * * * *